Figure 1:
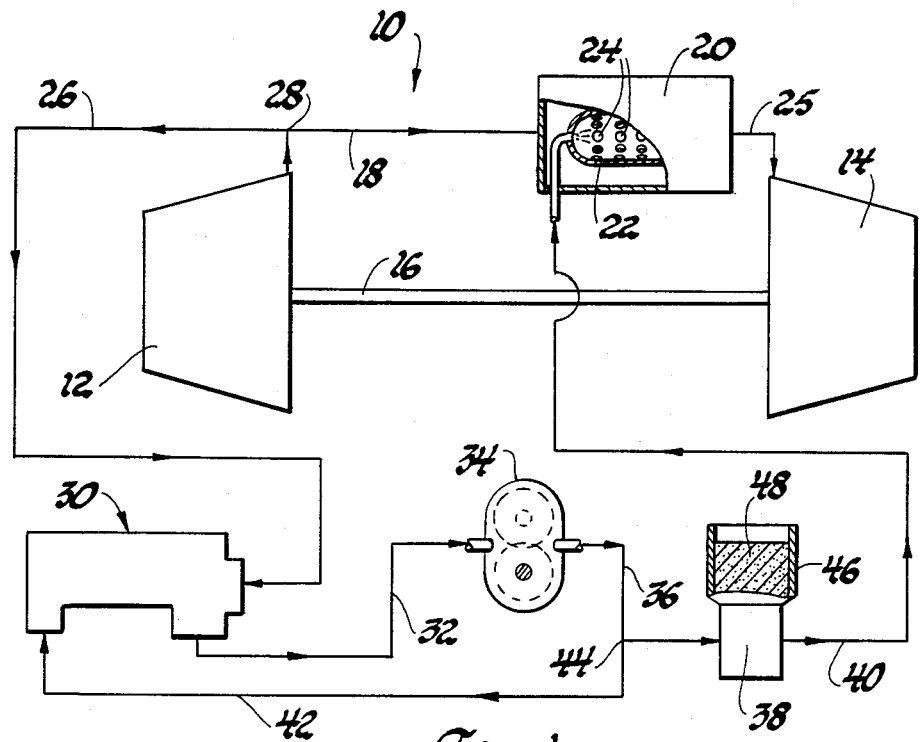

United States Patent [19]

Hitzelberger et al.

[11] Patent Number: 4,531,359
[45] Date of Patent: Jul. 30, 1985

[54] GAS TURBINE ENGINE FUEL SYSTEM

[75] Inventors: Alan L. Hitzelberger, Grand Blanc; Everett W. Shows, Lake Orion, both of Mich.

[73] Assignee: General Motors Corporation, Detroit, Mich.

[21] Appl. No.: 548,710

[22] Filed: Nov. 4, 1983

[51] Int. Cl.³ .............................................. F02C 3/26
[52] U.S. Cl. ................................. 60/39.27; 60/39.464; 417/252; 417/295
[58] Field of Search ............... 60/39.27, 39.29, 39.464; 417/252, 253, 295; 110/106

[56] References Cited

U.S. PATENT DOCUMENTS

| | | | |
|---|---|---|---|
| 2,683,418 | 7/1954 | Smith | 417/309 |
| 3,398,526 | 8/1968 | Olah | 60/39.281 |
| 3,912,419 | 10/1975 | Lutz et al. | 417/252 |
| 4,208,871 | 6/1980 | Riple | 417/252 |
| 4,392,347 | 7/1983 | Shows | 60/39.27 |

Primary Examiner—Louis J. Casaregola
Attorney, Agent, or Firm—Saul Schwartz

[57] ABSTRACT

An improvement in a gas turbine engine fuel system of the type having an air pump delivering a stream of pressurized air at pump discharge pressure to a powdered coal manifold which manifold meters powdered coal into the airstream for delivery to and combustion in a combustor maintained at engine compressor discharge pressure, the improvement residing in the provision of an inlet restricting valve at the air pump inlet responsive to compressor discharge pressure and to pump discharge pressure to control the airflow inlet area to the pump so that pump discharge pressure varies directly with compressor discharge pressure and is maintained in excess of compressor discharge pressure with the ratio of pump discharge pressure to compressor discharge pressure remaining substantially constant throughout the operating range of the engine.

4 Claims, 2 Drawing Figures

U.S. Patent     Jul. 30, 1985     4,531,359

GAS TURBINE ENGINE FUEL SYSTEM

BACKGROUND OF THE INVENTION

1. Field of the Invention

This invention relates generally to gas turbine engine fuel systems and, more particularly, to an improvement in systems for conveying metered quantities of powdered fuel, such as coal, to a gas turbine engine combustor.

2. Description of the Prior Art

In gas turbine engines operated on solid fuels, such as powdered coal, the fuel is usually stored at atmospheric pressure and metered to a high pressure delivery circuit for movement to the engine's combustor against the compressor discharge pressure existing in the latter. In U.S. Pat. No. 4,342,428, issued Aug. 3, 1982 to Thomas P. Kosek and assigned to the assignee of this invention, means are disclosed for metering powdered coal from low pressure storage into a high pressure stream of air flowing from an air pump to the engine's combustor. Reference may also be made to U.S. Pat. No. 4,296,888 issued Oct. 27, 1981 to Kosek and Steinhilper and assigned to the assignee of this invention, for a description of a nozzle for injecting powdered coal into a combustor. In order for the airstream to flow from the air pump to the combustor, the pump discharge pressure must exceed compressor discharge pressure in the combustor. Most desirably, the pump discharge pressure should exceed compressor discharge pressure by an amount sufficient to effect efficient clean-out of fuel from the metering device and transport to the combustor but not by so much as to reduce combustion efficiency. In U.S. Pat. No. 4,392,347, issued July 12, 1983 to Everett Shows and assigned to the assignee of this invention, a system is disclosed wherein the difference between air pump discharge pressure and compressor discharge pressure is maintained constant throughout the working range of the engine. A gas turbine engine fuel system according to this invention represents an improvement over this and other known systems in that it maintains a constant ratio between air pump discharge pressure and compressor discharge pressure throughout the working range of the engine.

SUMMARY OF THE INVENTION

The primary feature, then, of this invention is that it provides a new and improved fuel system for a gas turbine engine operating on powdered fuel. Another feature of this invention is that it provides a new and improved gas turbine engine fuel system wherein the ratio between the pressure of a pump discharge airstream transporting metered quantities of powdered fuel to a combustor and an engine compressor discharge pressure is maintained substantially constant throughout the working range of the engine. Still another feature of this invention resides in the provision in the new and improved gas turbine engine fuel system of an air pump supplied with air at compressor discharge pressure and discharging air at a higher pump discharge pressure and in the provision of an inlet restricting valve at the air pump inlet responsive to the ratio between pump discharge pressure and compressor discharge pressure to vary the restriction at the pump inlet and thereby maintain a constant ratio between the pump and the compressor discharge pressures throughout the operating range of the engine without bypassing air at pump discharge pressure.

Figure 2:
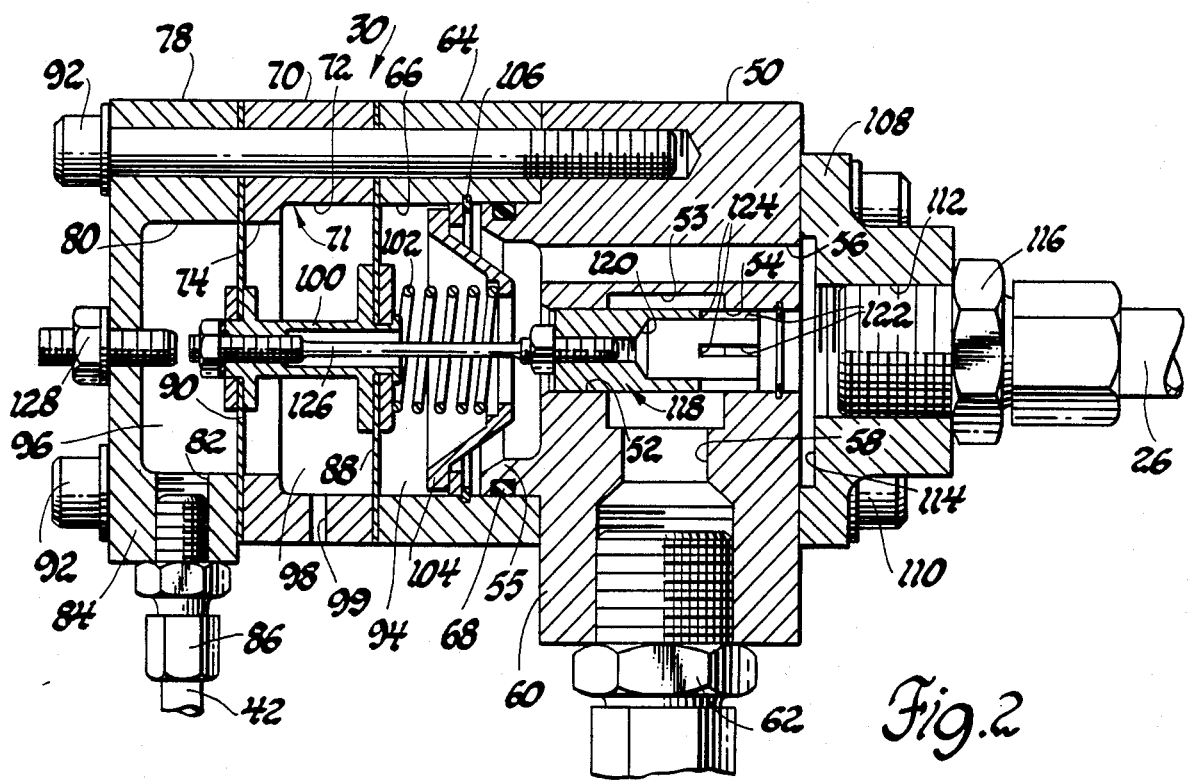

These and other features of this invention will be readily apparent from the following specification and from the drawings wherein:

FIG. 1 is a schematic representation of an improved gas turbine engine fuel system according to this invention; and FIG. 2 is an enlarged view of a portion of FIG. 1 showing the air pump inlet restricting valve.

Referring now to FIG. 1 of the drawings, a schematically illustrated gas generator or gasifier portion 10 of a gas turbine engine includes a compressor 12 and a gasifier turbine 14 connected to the compressor by a shaft 16. A duct 18 from the compressor 12 feeds air at compressor discharge pressure to a plenum 20 in which is disposed a combustor 22 having a plurality of ports 24. The products of combustion developed within the combustor 22 exhaust through nozzles represented by a duct 25 and drive the gasifier turbine which, in turn, drives the compressor 12 through shaft 16. The ports 24 provide communication between the reaction chamber of the combustor 22 and the plenum 20 so that the reaction chamber is also maintained at essentially compressor discharge pressure which is a function of the rotative speed of the gasifier turbine and the compressor rotor.

A duct 26 branches from duct 18 at a tee 28 and terminates at an inlet restricting valve 30. A duct 32 extends between the valve 30 and the inlet of an air pump or boost compressor 34. The air pump 34 is conventional in design and is driven independently of the gasifier portion 10 with sufficient power to always meet or exceed air pump demand. The air pump 34 raises or boosts the pressure of air delivered at compressor discharge pressure through ducts 26 and 32 and discharges it at pump discharge pressure through a duct 36 which extends between the pump and a fuel manifold 38. A duct 40 extends between the manifold 38 and the combustor 22. A feedback duct 42 extends between the valve 30 and a tee 44 in duct 36.

As seen best in FIG. 1, the fuel manifold 38 has supported thereon a fuel hopper 46 containing a supply of powdered coal 48 at atmospheric pressure. The hopper 46 and the fuel manifold 38 cooperate in metering specific quantities of powdered coal into a stream of air at pump discharge pressure passing from duct 36 to duct 40. While the specific structure of the hopper and the manifold form no part of this invention, reference may be made to the aforementioned U.S. Pat. No. 4,342,428 for a full and complete description of an operative manifold and hopper assembly.

Referring now to FIG. 2, the valve 30 includes a generally circular valve body 50 having a central bore 52 therethrough with an internal cylindrical undercut 53 around the central bore which intersects the latter at a circular lip 54. An annular flange 55 integral with the valve body 50 concentrically surrounds the central bore 52 and a bore 56 extends through the valve body 50 parallel to the central bore. A cross bore 58 in a boss 60 integral with the valve body extends perpendicular to the central bore 52 and intersects undercut 53. A conventional fitting 62 attached to the valve body at boss 60 connects cross bore 58 to duct 32.

With continued reference to FIG. 2, a first annular diaphragm housing 64 abuts the left side of valve body 50 with a cylindrical bore 66 thereof closely received around the annular flange 55. An O-ring 68 in an appropriate groove in the flange 55 sealingly engages the cylindrical bore 66 of the first diaphragm housing. A second annular diaphragm housing 70 abuts the first diaphragm housing 64 and includes a stepped cylindrical bore 71 having a large diameter portion 72 corresponding to the cylindrical bore 66 in the first diaphragm housing and a small diameter portion 74. An end housing 78 having a cylindrical internal cavity 80 with a diameter corresponding to the small diameter bore portion 74 abuts the second annular diaphragm housing 70. A bore 82 in a boss 84 of the end housing 78 intersects the cavity 80 and is connected to duct 42 by a conventional fitting 86.

A first flexible diaphragm 88 is captured between the first diaphragm housing 64 and the second diaphragm housing 70. A second flexible diaphragm 90 is captured between the second diaphragm housing 70 and the end housing 78. A plurality of cap screws 92 extend through the end housing 78 and the first and second diaphragm housings 64 and 70 and thread into the valve body 50 for attaching the housings to the valve body while rigidly clamping the first and second diaphragms in place. The first diaphragm 88 cooperates with the first diaphragm housing and the valve body 50 in defining a compressor discharge pressure chamber 94 while the second diaphragm 90 cooperates with the cavity 80 in end housing 78 in defining a pump pressure chamber 96. The first and second diaphragms 88 and 90 cooperate with each other and with the second diaphragm housing 70 in defining therebetween an ambient pressure chamber 98 connected to the surrounding environment by an orifice 99 through the second diaphragm housing.

With continued reference to FIG. 2, the first and second diaphragms 88 and 90 are interconnected for unitary flexure by a connecting member 100 attached to each of the diaphragms and aligned with the central bore 52. A coil spring 102 in the compressor discharge pressure chamber 94 seats at one end against the connecting member 100 and at the other end against an annular spring seat 104 held in place by a retaining ring 106. The spring 102 biases the connecting member 100 and consequently the first and second diaphragms 88 and 90 to the left.

A cover 108 is attached to the right side of valve body 50 by a plurality of cap screws 110 and includes a bore 112 and a counterbore 114 adjacent the valve body. The counterbore 114 overlies both the central bore 52 and the bore 56 in the valve body while bore 112 is connected to duct 26 by a conventional fitting 116.

A cylindrical valve spool 118 is slidably disposed in the central bore 52 and includes a cavity 120 opening toward cover 108 and a plurality of circumferentially spaced notches 122 extending from the right end of the valve spool to a corresponding plurality of lands 124. A rod 126 is rigidly attached, as by threaded connections, to the valve spool 118 and to the connecting member 100 so that unitary flexure of the first and second diaphragms 88 and 90 is accompanied by corresponding sliding movement of the valve spool 118 in the central bore 52. An adjustable stopper 128 on the end housing 78 is aligned with the rod 126 and operates to limit leftward movement of the rod and attached valve spool.

Referring now to both drawing figures, when the engine is not operating, ambient pressure prevails in the plenum 20 and throughout the fuel system including compressor discharge pressure chamber 94, pump pressure chamber 96, and ambient pressure chamber 98. With no pressure differential across either of the diaphragms, spring 102 unitarily flexes the first and second diaphragms to the left to locate the valve spool 118, through rod 126, in an open position, FIG. 2, wherein lands 124 are spaced to the left of lip 54. To start the engine, compressor discharge air flow is initiated in ducts 18 and 26 by mechanical rotation of shaft 16 while power is simultaneously supplied to air pump 34 to initiate its operation. Because valve spool 118 is in an open position, air at compressor discharge pressure flows from duct 26, between lands 124 and lip 54, into cross bore 58 and duct 32 and into the inlet of the pump 34 wherefrom it emerges into duct 36 at higher, pump discharge pressure. Compressor discharge air also flows to compressor discharge pressure chamber 94 through bore 56 where it acts on the right surface of first diaphragm 88, flexing the latter to the left and moving connecting member 100, rod 126, and valve spool 118 further to the left until a maximum open position of the valve spool is achieved when the rod 126 engages stop 128. In the maximum open position, maximum air flow between lands 124 and lip 54 occurs. Concurrently, air at pump discharge pressure flows through the manifold 38 to combustor 22 while being fed back to pump chamber 96 through duct 42 where it acts on the left side of second diaphragm 90. At this early stage of the operational sequence, compressor discharge pressure and spring 102 are sufficient to overcome pump discharge pressure acting on second diaphragm 90 so the valve spool remains open.

The condition just described obtains until compressor discharge pressure and pump discharge pressure achieve levels at which combustion and fuel transport, respectively, can be sustained. At that instant, manifold 38 is actuated to commence metering fuel into the pump discharge airstream at a rate corresponding to engine idle. Also at that instant, ignition means, not shown, at the combustor are energized to initiate combustion of the powdered coal in the compressor discharge air in the combustor 22. Very quickly, then, gasifier turbine 14 accelerates compressor 12 to a speed corresponding to engine idle so that compressor discharge pressure and, hence, pump discharge pressure, likewise quickly increase. Compressor discharge pressure increases to a stabilized level corresponding to engine idle as determined by the quantity of fuel being metered by manifold 38. Even with compressor discharge pressure stabilized, pump discharge pressure in ducts 36 and 42 and in pump chamber 96 continues to increase so that the force on the left side of second diaphragm 90 increases until rightward flexure of the diaphragm causes valve spool 118 to move to the right narrowing the gap between lands 124 and lip 54 and throttling the air flow to the pump 34. As pump inlet air flow is progressively throttled, the rate of increase of pump discharge pressure decreases until a condition of static balance across the first and second diaphragms 88 and 90, respectively, is achieved wherein valve spool 118 permits only enough pump inlet air to flow between lands 124 and lip 54 to maintain static balance.

In the static balance condition, pump discharge pressure in pump chamber 96 equals compressor discharge pressure in chamber 94 multiplied by a factor corresponding to the ratio of the exposed area of first diaphragm 88 to the exposed area of the second diaphragm 90 plus a relatively small constant amount corresponding to the force exerted by spring 102. Since the exposed area of first diaphragm 88 exceeds the exposed area of second diaphragm 90 by an amount corresponding to the differences between the diameters of large diameter bore portion 72 and small diameter bore portion 74, air pump discharge pressure at static balance exceeds compressor discharge pressure so that air flow to the combustor through ducts 36 and 40 is maintained. Stated slightly differently, the ratio of air pump discharge pressure to compressor discharge pressure is generally constant and equal to the ratio of the exposed areas of first diaphragm 88 and second diaphragm 90. At engine idle, then, air pump 34 delivers air at a pressure exceeding compressor discharge pressure by a predetermined amount corresponding to the compressor discharge pressure multiplied by the ratio of the exposed area of the first diaphragm to the exposed area of the second diaphragm.

To increase engine power, the metering rate of manifold 38 is increased so that the gasifier turbine and the compressor accelerate to and stabilize at a higher speed corresponding to the increased fuel delivery rate. Compressor discharge pressure likewise increases and stabilizes at a higher level corresponding to the increased gasifier speed, thus temporarily destroying the static pressure balance across the first and second diaphragms 88 and 90 and unitarily flexing each to the left to open the gap between lands 124 and lip 54 and admit more air to the air pump inlet. Consequently, air pump discharge pressure increases until it achieves a level sufficiently in excess of compressor discharge pressure to reestablish static balance across the diaphragm. Under the new static balance condition, the ratio of pump discharge pressure to compressor discharge pressure once again equals the ratio of the exposed areas of the first and second diaphragms plus the small factor corresponding to the effect of spring 102. Importantly, however, the absolute pressure difference across the increased gap between lands 124 and lip 54, equal to the absolute difference between pump discharge pressure and compressor discharge pressure, at the higher power level exceeds the absolute difference at engine idle or, in fact, at any lower engine power level. The net effect of the increased gap and increased absolute pressure difference is constant air flow velocity both to the pump inlet and from the pump discharge so that the thoroughness of the transfer of coal powder from the manifold 38 to the airstream in duct 40 is not diminished as might otherwise occur with a constant absolute pressure difference.

In the opposite direction, engine power is reduced by a reduction of the rate at which coal is metered by manifold 38 into duct 40 which reduction is accompanied by a corresponding decrease in gasifier turbine speed and compressor speed. Accordingly, compressor discharge pressure in chamber 94 decreases and temporarily upsets the static balance across first and second diaphragms 88 and 90 which then unitarily flex to the right causing valve spool 118 to throttle the flow of air between lands 124 and lip 54. The result is a reduction in the pump discharge pressure in pump chamber 96 which continues until static pressure balance is once again achieved across the first and second diaphragms 88 and 90. At static balance, the ratio of the pump discharge pressure to the compressor discharge pressure again equals the ratio of the exposed areas of first and second diaphragms plus the small factor attributable to the force exerted by spring 102.

To enhance the precision of air flow control across the gap between lands 124 and lip 54, valve spool 118 is very nearly completely pressure balanced. That is, air at compressor discharge pressure acts from the right on the total projected area of the valve spool 118 to direct exposure of cavity 120 and the surrounding annular edge of the spool to the pressure in duct 26. Simultaneously, the air in compressor discharge pressure chamber 94 at the same pressure acts on the opposite side of valve spool 118 so that balance is achieved. A slight pressure unbalance exists, however, due to the fact that air is excluded from an area corresponding to the cross sectional area of the rod 126. However, because the forces necessary to move the effectively balanced spool 118 are relatively small, the cross sectional area of the rod may likewise be small so that only an essentially negligible pressure unbalance exists.

The embodiments of the invention in which an exclusive property or privilege is claimed are defined as follows:

1. In a gas turbine engine having an operating range between idle and full power and including a combustor, a compressor adapted to supply pressurized air at a variable compressor discharge pressure proportional to engine power to said combustor for fuel combustion within said combustor, a fuel supply apparatus operative to supply metered quantities of powdered combustible fuel, nozzle means at said combustor for dispersing a mixture of said powdered fuel and air into said combustor for combustion therein, an air pump driven independently of said compressor having an inlet and a discharge wherefrom a stream of air is provided at a pump discharge pressure proportional to pump inlet flow area, means connecting said pump discharge to said nozzle means so that said airstream is dispersed by said nozzle means into said combustor, and means connecting said fuel supply apparatus to said pump discharge so that said metered quantities of powdered fuel are entrained in said airstream at said pump discharge pressure and delivered thereby to said nozzle means for dispersal into said combustor, the improvement comprising, valve means at said pump inlet operative to restrict pump inlet flow area thereby to control said pump discharge pressure, and control means connected to each of said compressor and said air pump and said valve means responsive to the instantaneous magnitude of a ratio of said pump discharge pressure to said compressor discharge pressure and operative to actuate said valve means to vary said pump inlet flow area and thereby said pump discharge pressure to maintain said pressure ratio substantially constant throughout said engine operating range.

2. The improvement in claim 1 wherein said valve means includes a shiftable valve element operative to vary said pump inlet flow area and said control means includes a first flexible diaphragm exposed on one side to said compressor discharge pressure and on the other to atmospheric pressure, a second flexible diaphragm exposed on one side to said pump discharge pressure and on the other side to atmospheric pressure, and connecting means rigidly attached to each of said first and said second diaphragms to insure unitary flexure thereof and to said shiftable valve element to shift the latter in accordance with said instantaneous pressure ratio and thereby maintain said pressure ratio substantially constant.

3. In a gas turbine engine having an operating range between idle and full power and including a combustor, a compressor adapted to supply pressurized air at a variable compressor discharge pressure proportional to engine power to said combustor for fuel combustion within said combustor, a fuel supply apparatus operative to supply metered quantities of powdered coal, nozzle means at said combustor for dispensing a mixture of said powdered coal and air into said combustor for combustion therein, an air pump driven independently of said compressor having an inlet and a discharge wherefrom a stream of air is provided at a pump discharge pressure proportional to pump inlet flow area, means connecting said pump discharge to said nozzle means so that said airstream is dispersed by said nozzle means into said combustor, and means connecting said fuel supply apparatus to said pump discharge so that said metered quantities of powdered coal are entrained in said airstream at said pump discharge pressure and delivered thereby to said nozzle means for dispersal into said combustor, the improvement comprising, duct means between said compressor and said air pump inlet operative to convey air at said compressor discharge pressure to said pump inlet, valve means in said duct means including a valve lip and a valve element movable between a plurality of control positions relative to said valve lip whereby said pump inlet flow area is varied to vary correspondingly said pump discharge pressure, housing means defining a first chamber having an open end, means connecting said first chamber to said compressor whereby air at said compressor discharge pressure is supplied to said first chamber, a first flexible diaphragm closing said first chamber open end exposed on one side across a first area to said compressor discharge pressure and on the other side across said first area to atmospheric pressure, housing means defining a second chamber having an open end, means connecting said second chamber to said pump discharge whereby air at said pump discharge pressure is supplied to said second chamber, a second flexible diaphragm closing said second chamber open end exposed on one side across a second area less than said first area to said pump discharge pressure and on the other side across said second area to atmospheric pressure, and a rod rigidly attached to each of said first and said second diaphragms to insure unitary flexure thereof and to said valve element whereby said valve element is located relative to said valve seat in accordance with the instantaneous ratio of said pump discharge pressure to said compressor discharge pressure and shifted between said control positions by changes in either of said compressor or said pump discharge pressure such that the latter is maintained substantially constant.

4. The improvement recited in claim 3 wherein said valve element is a cylinder exposed on both ends to air at said compressor discharge pressure for purposes of effectively pressure balancing said valve element.

* * * * *